Feb. 2, 1960 A. SCHMIDLI 2,923,279
PIPE SUPPORTING STRUCTURE FOR STEAM GENERATORS
Filed Feb. 17, 1954

INVENTOR.
ADALBERT SCHMIDLI
BY
ATTORNEYS

_United States Patent Office_ 2,923,279
Patented Feb. 2, 1960

2,923,279

PIPE SUPPORTING STRUCTURE FOR STEAM GENERATORS

Adalbert Schmidli, Winterthur, Switzerland, assignor to Sulzer Frères, Société Anonyme, Winterthur, Switzerland Application February 17, 1954, Serial No. 410,957

Claims priority, application Switzerland September 29, 1953

4 Claims. (Cl. 122—510)

This invention relates to an improved pipe holder, particularly for horizontal wall pipes of steam generators which are supported by vertical carrier pipes. An object of this new pipe holder is to allow for free movement of the horizontal wall pipes relative to the carrier pipe in order that no undue stress may be set up in the pipes due to thermal expansion and contraction.

Another object of the improved pipe holding device is to provide for easy assembly of wall pipes in the relatively limited confines of a steam generator.

Still another object of the present invention is to line the combustion chamber of steam generators by means of horizontal wall pipes wherein each individual pipe is separately fastened to a carrier pipe extending vertically between the wall pipes and the walls of the combustion chamber.

Referring to the drawings.

Figures 1, 2:
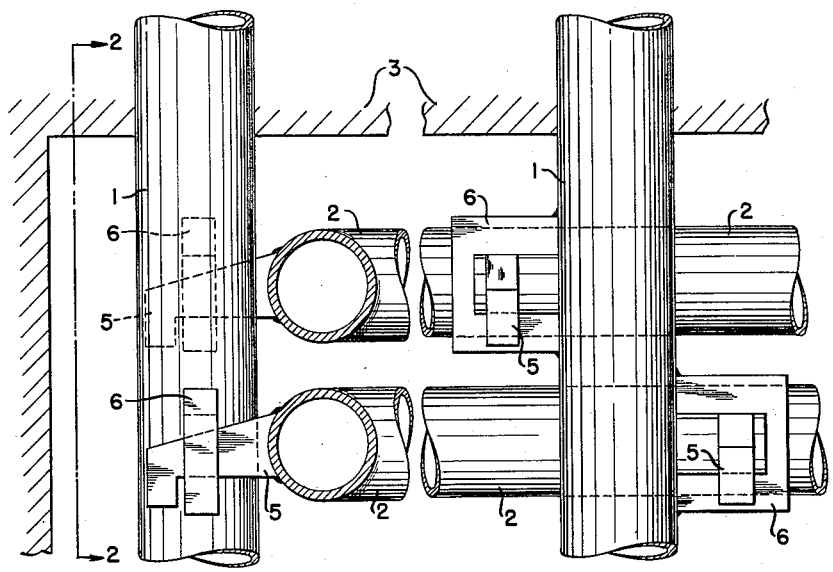
Figure 1 shows a preferred embodiment of the invention wherein there are eyes or eyelets mounted on the carrier pipe for receiving a hooked end of supporting bars which are attached to the horizontal wall pipes.
Figure 2 is a side view of Figure 1 showing the form of attachment of the eyelets to the carrying pipe.

Referring to the figures in detail, the vertical carrying pipes are designated by 1 and the wall pipes by 2. At suitable places, the carrier pipes pass through the combustion chamber wall 3 and are held the required distance away from the vertical combustion chamber walls by means of member 4. A work medium or fluid may pass through the carrier pipes in the same manner as through the wall pipes. Welded to the wall pipes are hook-like horizontally overhanging supporting parts 5 which rest upon mount members attached to the carrier pipe. As shown in Figures 1 and 2, this mounting member can be shaped in the manner of an eye or a yoke 6, the two ends of which are welded to the carrier pipe in a plane passing through the center of the carrier pipes and generally parallel to the wall pipes in such a way as to form an orifice defined by the yoke branches and the tube wall and into which the hook-shaped support members 5 of the wall pipe protrude. The hook-shaped support member 5, which is welded to the wall pipe, fits freely in the large eye of the mounting member 6 which in turn provides a bearing surface for the hook member. The eye of the mount member is made large enough so that the hook member can move freely in a horizontal direction in order to take up any thermal expansion or contraction of the wall pipes. By hooking the support member into the eye, any sliding off the bearing formed between the mount member and the support member is prevented. It may be advisable, in order to prevent imposing unfavorable stresses upon the carrier pipe, to arrange the eyes or mount members alternately on opposite sides of the carrier pipe as shown in Figure 2. Although the design of the mount member in the form of closed eyes is advantageous, one can also use instead an angle iron welded on one side of the carrier pipe or a U-shaped bracket welded on one side of the carrier pipe.

Figures 3, 4:
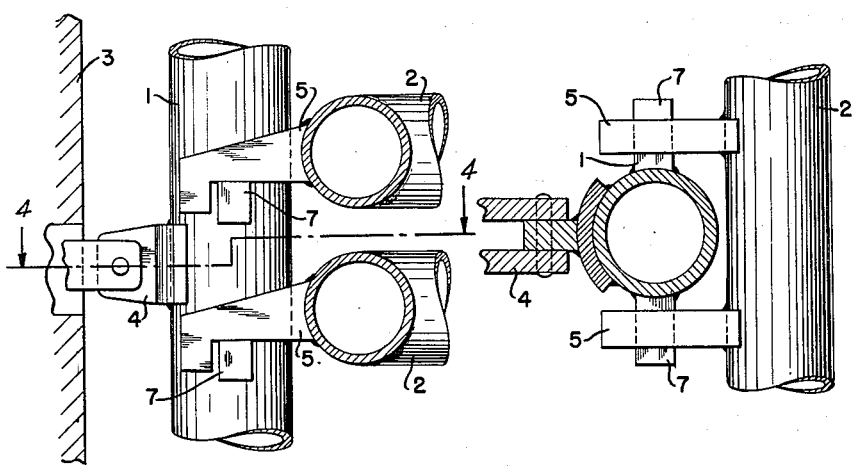
Figure 3 shows a slightly different modification of the pipe holding device wherein the supporting bars bracket the pipe carrier.
Figure 4 is a horizontal section of Figure 3 taken along line 4—4 of Figure 3.

In Figures 3 and 4 a pipe holding device of even simpler design is shown than in Figures 1 and 2. This consists of two incidental mounts 7, preferably squared iron bars, welded to the carrier pipes 1. In this case, the two hook-like supporting members 5 rest upon the two iron bar projections 7 welded to the carrier pipe at the same level and on opposite sides thereof. Two hook supporting members that bracket the carrier pipe are necessary in order to prevent undue horizontal movement which would result in the hook members sliding off the iron bars. However, the distance between the two hook supporting members should be greater than the width of the carrier pipe in order that some free horizontal movement may be had in order to compensate for thermal expansion and contraction of the horizontal wall pipes. Another method of attachment, not shown, is to have two carrier pipes between two hook supporting members connected to the same horizontal wall pipe and to have the hook members rest on iron bar mounts welded on the two carrier pipes and on opposite sides thereof. Here also, provision is made to afford horizontal movement of the wall pipes in order to allow for the thermal expansion and contraction.

In suspending the wall pipes in the manner contemplated in the present invention, any scale formation on the suspension device is effectively avoided as the latter has no part exposed to the full combustion chamber radiation since the device is situated substantially entirely in the radiation shadow of the horizontally extending wall pipes. In this respect, as shown clearly in the drawing, the vertical dimensions of the support and mounting members 5—7 are not substantially greater than the diameter of the wall pipes 2.

I claim:

1. In a steam generator having a combustion chamber, vertically aligned wall pipes extending horizontally in said chamber adjacent at least one wall thereof, carrier pipes extending vertically in said chamber between said wall and the wall pipes and supporting means interengaging said carrier and wall pipes; the improvement characterized by said supporting means comprising at least one mounting member projecting laterally from each of said carrier pipes in a plane passing through the center of the carrier pipes and generally parallel to said wall pipes, said mounting members having a vertical dimension not substantially greater than the diameter of said wall pipes and each being positioned substantially directly opposite a wall pipe to lie substantially in a radiation shadow formed by the wall pipe, said supporting means further including at least one support member projecting laterally from each wall pipe towards said chamber wall at substantially right angles to said mounting members and alongside said carrier pipes, said support members having a vertical dimension not substantially greater than the diameter of said wall pipes and projecting substantially horizontally therefrom to lie substantially in radiation shadows formed by the pipes from which they project, the support member of each wall pipe resting upon the mounting member of one of the carrier pipes and each support member having an end portion extending downwardly between its associated mounting member and said chamber wall for engagement with said mounting member upon limited horizontal movement of the wall pipe to which the support member is attached away from said chamber wall, the relative spacing of the carrier pipes from the wall and the wall pipes from the carrier pipes and the length of the support members being such that horizontal movement of said wall pipes towards said chamber wall is limited by engagement of said carrier pipes and wall pipes, each of said support members being adapted to engage the carrier pipe having the mounting means upon which said support member rests upon limited horizontal movement of the wall pipe carrying the support means in one axial direction, said supporting means further including means comprising in part said support member for limiting horizontal movement of said wall pipes in the other axial direction.

2. The apparatus of claim 1, in which the mounting members are of U-shaped configuration and the legs of the members are secured to said carrier pipes to form therewith openings, said support members are received in said openings, and said openings are of a size to accommodate limited horizontal movement of said support members in any direction.

3. The apparatus of claim 2, in which said mounting members project alternately from opposite sides of said carrier pipes at successive levels.

4. The apparatus of claim 1, in which said mounting members are projections extending in pairs from opposite sides of said carrier pipes, and said support members are hook-like members extending on opposite sides of said carrier pipes and resting on said projections, said hook-like members being spaced apart a predetermined distance greater than the diameter of said carrier pipes to accommodate limited horizontal movement of said wall pipes in both axial directions.

References Cited in the file of this patent

UNITED STATES PATENTS

| | | |
|---|---|---|
| 443,866 | Pauli | Dec. 30, 1887 |
| 766,858 | Wheeler | Aug. 9, 1904 |
| 768,295 | Palfrey | Aug. 23, 1904 |
| 1,025,979 | Hinze | May 14, 1912 |
| 2,015,328 | Wood | Sept. 24, 1935 |
| 2,228,953 | Hackett | Jan. 14, 1941 |
| 2,310,801 | Mayo et al. | Feb. 9, 1943 |
| 2,714,877 | Andrew | Aug. 9, 1955 |
| 2,716,968 | Hess et al. | Sept. 6, 1955 |

FOREIGN PATENTS

| | | |
|---|---|---|
| 475,281 | Great Britain | of 1937 |
| 898,090 | France | Apr. 10, 1945 |
| 103,575 | Sweden | Jan. 27, 1942 |